United States Patent [19]

Johnson et al.

[11] 4,200,526
[45] Apr. 29, 1980

[54] PROCESS FOR TREATING WASTE WATER

[75] Inventors: Earl W. Johnson, West Chester; Malcolm J. Reider; Robert Anewalt, both of Reading; Harry J. Kring, Mohnton, all of Pa.

[73] Assignee: Gerber Products Company, Fremont, Mich.

[21] Appl. No.: 884,099

[22] Filed: Mar. 6, 1978

[51] Int. Cl.² .............................................. C02B 1/20
[52] U.S. Cl. .................................. 210/23 H; 210/50; 210/51
[58] Field of Search ................... 210/23 R, 50, 53, 60, 210/51-52, 56, 23 H

[56] References Cited

U.S. PATENT DOCUMENTS

| 3,770,630 | 11/1973 | Kamperman | 210/50 |
| 3,939,070 | 2/1976 | Roth | 210/23 H |
| 4,046,686 | 9/1977 | Goldstein | 210/23 H |
| 4,057,495 | 11/1977 | Kinoshita et al. | 210/56 X |

FOREIGN PATENT DOCUMENTS

| 2323600 | 11/1974 | Fed. Rep. of Germany | 210/50 |
| 49-123474 | 11/1974 | Japan | 210/50 |
| 50-35032 | 11/1975 | Japan | 210/23 H |

*Primary Examiner*—Thomas G. Wyse

[57] ABSTRACT

A purification process for waste water from a textile plant and other manufacturing processes. After preliminary filtering to remove foreign particles, the waste water is treated with a reducing agent, if needed, and the pH adjusted to 8.0-9.5. The waste water is then treated with a flocculating agent. After further treatment in a clarifier, the waste water is passed through a sand filter to remove any residual suspended solids. The pH is adjusted to below about 6.0 and the waste water is then subjected to reverse osmosis.

7 Claims, 2 Drawing Figures

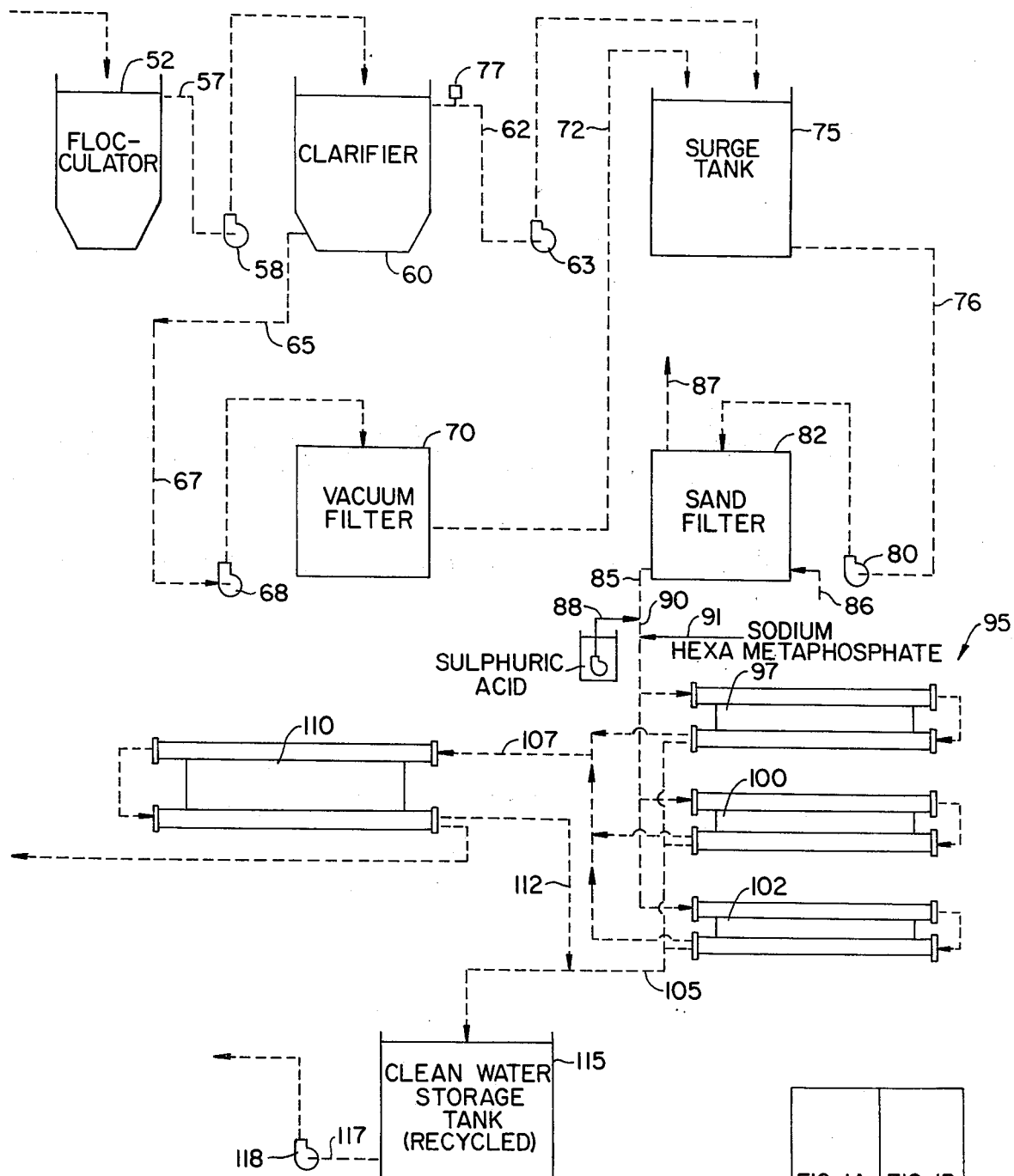
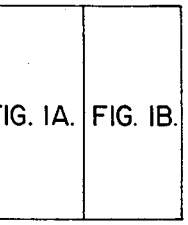
FIG._1B.
FIG._1.

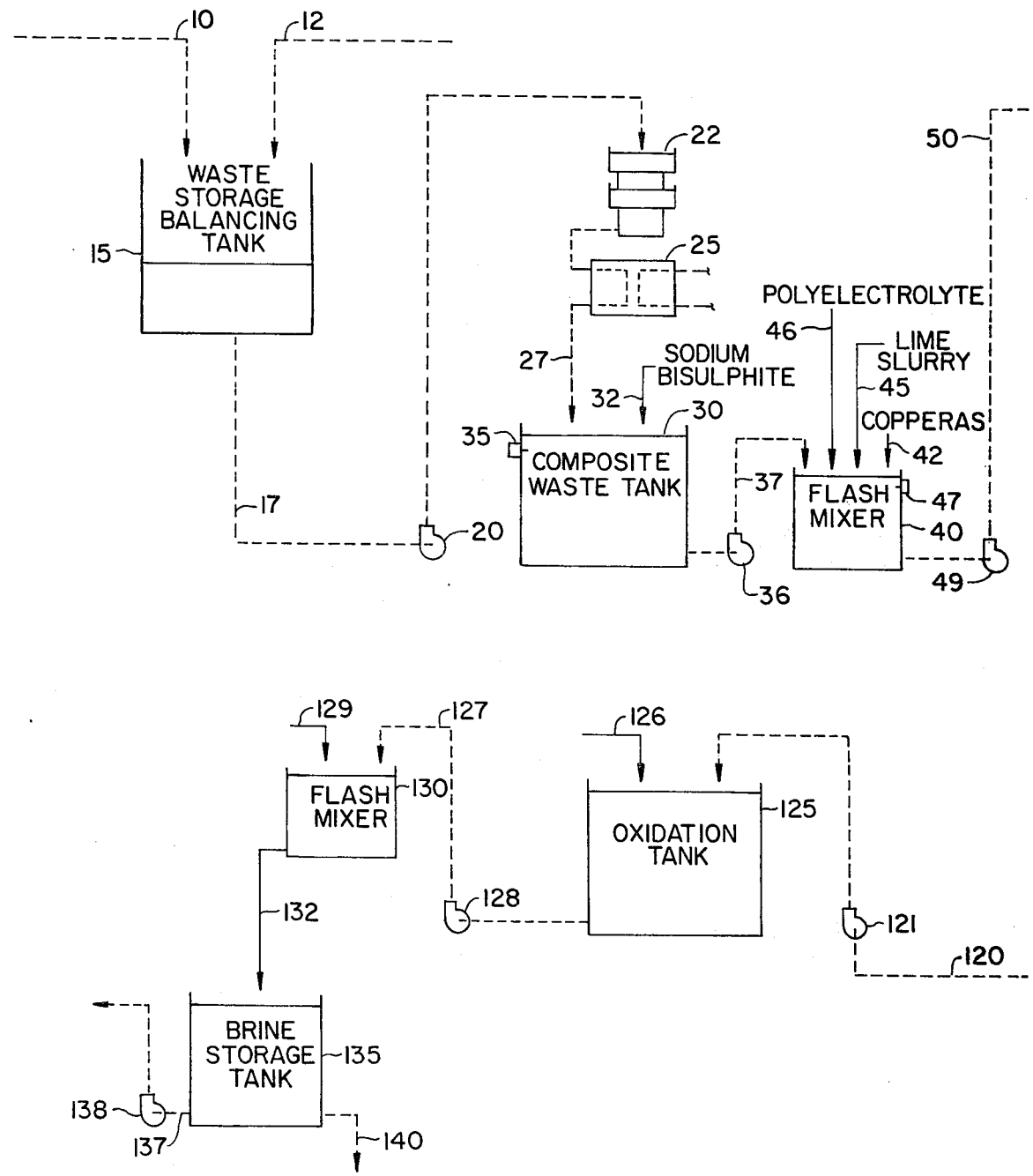
FIG._1A.

PROCESS FOR TREATING WASTE WATER

BACKGROUND OF THE INVENTION

The waste material from a textile treatment plant contains large amounts of various bleaches, dye waste liquors, miscellaneous organic salts, and suspended solids, including textile fibers. Moreover, the waste material is typically at elevated temperatures utilized in textile treatment processes.

The discharge of such waste into municipal sewers or nearby rivers would have numerous undesirable consequences. It is desirable to treat the waste so as to remove pollutants, recover salt and heat contained in the raw effluent, and produce processed water suitable for reuse in the plant.

By treatment of the plant waste in this fashion, large volumes of impure water are prevented from polluting the surrounding water environment. If the water is recycled, minimum effluents are discharged; if the water is not recycled the effluents are basically non-polluting. In either event, the plant will have succeeded in fulfilling a basic civic duty of avoiding pollution while insuring its compliance with relevant state and federal environmental protection regulations.

Osmosis is a known process involving migration of liquids through a semipermeable membrane. In particular, when liquids containing different concentrations of a solute are on opposite sides of the membrane, a pressure called osmotic pressure exists, causing liquid to pass from the region of dilute solution, through the membrane and into the region of concentrated solution, thereby diluting the more concentrated liquid and effecting an equalization of the osmotic pressures on each side of the membrane. The normal flow of liquids through the membrane may be stopped by the application of pressure to the solution on the higher concentration side. The pressure required is known as the osmotic pressure and is a characteristic of the particular solute/solvent system involved.

The application of a pressure in excess of the osmotic pressure to the region of concentrated solution is known to cause liquid and other permeates to flow to the region of dilute solution, thereby increasing the inequality of concentration. Such a procedure is named "reverse osmosis." By employing a series of reverse osmosis steps, with appropriate pressure application, relatively pure liquid can be recovered.

However, reverse osmosis tends not to work if the increased concentration on the high pressure side leads to precipitation of solids. In particular, if the solution is already in effect saturated, treatment in a reverse osmosis unit would result in precipitation and clogging up of the membrane. U.S. Pat. No. 4,046,686 discloses the addition of a sequestering agent to prevent such precipitation.

SUMMARY OF THE INVENTION

Reverse osmosis treatment of the waste effluent from a textile plant is rendered feasible by first removing from the raw effluent as much of the pollutants as possible. Thus, the effluent is initially passed through a lint strainer to remove all fibers and then through a heat exchanger to recover some of the heat added in the textile treatment process. A reducing agent is then added, if needed, to neutralize any excess peroxides present and the effluent is passed to a flash mixer. A flocculating agent such as ferric chloride is then added and the pH is adjusted to 8.0-9.5 with a slurry of an alkali such as lime, after which a solution of a polyelectrolite is added to assist in precipitation.

The flocculated waste passes to the clarifier where suspended material is allowed to settle out on the floor of clarifier. Clear supernatant liquid overflows to a surge tank. Precipitated sludge is removed from the bottom of the clarifier to suitable filter equipment. The insoluble precipitate is disposed of in an approved manner. Filtrate from the filter is added to a surge tank. The clarified supernatant from the surge tank is passed to a polishing filter. The resulting polished liquid is subjected to a pH adjustment to below about 6.0 using acid. Sequestering agent such as hexametaphosphate or EDTA (ethylene-diaminetetraaceticacid) is added prior to being passed through a reverse osmosis system to produce clean water suitable for re-use within the textile plant, and a brine reject.

The instant process has been found to be particularly effective when the raw waste water contains a surface active agent such as disclosed in U.S. Pat. No. 3,846,254 at column 3, line 59 to column 4, line 34. While the significance of such agents is not fully understood, it is theorized that such agents, when present in concentrations of at least about 50 ppm, assist unclogging of the reverse osmosis membrane, with attendant reduction in cleaning frequency.

As an additional advantage of the present invention, the concentrated brine resulting from an initial reverse osmosis step can be further concentrated by being subjected to additional reverse osmosis treatment, with the additional recovered quantities of clean water being added to the clean water from the first reverse osmosis pass.

Still further, the advantages provided by the instant process can be enhanced by subjecting the concentrated brine to oxidation to remove residual color and destroy organic materials present. Brine subjected to such oxidation can be used for processes in the plant requiring such salts.

Approximately 90 percent of the raw effluent water has been found to be recovered for recycling.

BRIEF DESCRIPTION OF THE DRAWINGS

FIGS. 1A and 1B are the left and right halves respectively of a schematic flow sheet showing the sequence of steps in the process of the present invention.

DETAILED DESCRIPTION OF THE DRAWINGS

The remainder of this specification will be directed to the description of a waste treatment system suitable for processing bleach waste, dye waste and rinse waters. It will be appreciated by those skilled in this art that the volumes and amounts of reactants can be varied widely to accommodate the specific make-up of any textile plant effluent.

The bleach and rinse waste are input at line 10 and the dye and salt waste are input at line 12 to a waste storage balancing tank 15. The balancing tank is intended to provide uniform waste and is therefore of suitable capacity to eliminate waste effluent surges. A 40,000 gallon tank is typical. The output from the storage balancing tank 15 is pumped through line 17 by pump 20 to vibrating lint strainer 22 in order to remove bulk fibers prior to processing.

The effluent is typically at a temperature of 140 to 180 degrees F. as a result of the heat added during the textile treatment processes. In order to recover at least a portion of this heat for further use in the textile process and at the same time reduce the temperature of the effluent to limits required by further steps of the effluent treatment process, the waste water with the lint removed is passed through heat exchanger 25 before going through line 27 to composite waste tank 30.

In the composite tank the waste is treated with a reducing agent such as sodium bisulfite, introduced through line 32, to neutralize any excess hydrogen peroxide that might be present. Although sodium bisulfite is a particularly effective reducing agent, any reducing agent would be satisfactory. Typical of satisfactory reducing agents are sodium sulfite, sodium sulfide, sodium thiosulfate, sodium hydrosulfite, stannous chloride, ferrous chloride, hydrazine and the like. The addition of the reducing agent is controlled by reduction-oxidation monitor 35 which insures reducing agent addition only when excess hydrogen peroxide is indicated to be present. Composite waste tank 30 is typically of 20,000 gallon capacity.

The waste water then passes via pump 36 through line 37 to flash mixer 40 where it is treated with sufficient of a flocculating agent such as a ferric chloride (or ferrous sulfate) solution introduced through line 42, to reduce the turbidity to less than about 10 Jackson turbidity units (JTU). Concurrently therewith, an alkaline solution such as lime slurry is introduced through line 45 in an amount controlled by pH monitor-controller 47, to maintain the pH at approximately 8.0–9.5, and preferably at about 8.2. In addition, polyelectrolyte is introduced through line 46. Flash mixer 40 is typically of a 300 gallon capacity.

After flash mixing, the waste is pumped via pump 49 through line 50 to flocculator 52 where it is allowed to flocculate for approximately 30 minutes. The liquid is pumped through line 57 via pump 58 to clarifier 60. In clarifier 60, any sludge settles out and clear supernatant liquid is withdrawn through line 62 via pump 63 for temporary retention in surge tank 72. The sludge is thickened by flights of rakes (not shown) in the bottom of the clarifier 60 and is returned through line 65 for transfer through line 67 via pump 68 to vacuum filter 70. The filter cake is continuously removed from filter 70, typically for deposit on a sanitary land fill. The filtrate passes through line 72 to be combined with clarifier effluent in surge tank 75. Surge tank 75 is typically of a 6,000 gallon capacity. Turbidity monitor 77 on line 62 provides a continuous signal indicating whether clarification is satisfactory.

The water in surge tank 75 is pumped through line 76 by constant pressure pump 80 to sand filter 82 where any remaining residual suspended solids are removed. Provision is made for the back washing of sand filter 82. Thus, backwash water can be introduced through line 86 and the backwash discharge caused to pass through line 87 to waste storage balancing tank 15 to be combined with raw textile plant effluent for further treatment.

The filtrate from sand filter 82 is caused to flow through line 85 where a suitable acid, such as sulfuric acid, is added through line 88, to lower the pH to below about 6.0, most advantageously to a value in the range of 5.0 to 6.0, and preferably to about 5.5. The preferred pH range has been found to vary with the type of reverse osmosis membrane employed. A water softening sequestering agent such as sodium hexametaphosphate is then added via line 91 to the pH-adjusted filtrate as it is passed through line 90 for treatment in reverse osmosis system 95. Reverse osmosis system 95 is shown as containing three conventional reverse osmosis units 97, 100, and 102, such as illustrated in U.S. Pat. No. 4,046,686. Each unit is sized to have a capacity of 50 percent of the throughput of the system. Reverse osmosis unit 102 is maintained for standby operation, as would be indicated should one of the other two units 97 and 100 become inoperative.

The permeate leaving through line 105, from reverse osmosis system 95 represents approximately 85 to 90 percent of the input through line 90. The remaining 10 to 15 percent is concentrated brine that is passed out through line 107 to a further reverse osmosis unit 110, if desired. Reverse osmosis unit 110 discharges approximately one-half of the brine input as water through line 112 for addition to the permeate being recovered through line 105 for transfer to clean water storage tank 115. Clean water storage tank 115 may be a 100,000 gallon tank which supplies water for the plant processes, the water being withdrawn through line 117 and pump 118.

The concentrated brine from reverse osmosis unit 110, constituting approximately 5.0 to 7.5 percent of the total input from line 90 is pumped through line 120 via pump 121 to oxidation tank 125 where an oxidizing agent such as ozone or chlorine is added via line 126 to remove residual color and destroy organic materials. A three-hour detention time in oxidation tank 125 has been found to be particularly effective. Oxidation tank 125 is typically of a 3,000 gallon capacity.

Thereafter, the treated brine is pumped through line 127 via pump 128 to mixing tank 130 where deozonator or dechlorinator, controlled by a reduction oxidation monitor, is added via line 129. The brine is then passed through line 132 to brine storage tank 135. Brine in tank 135 may be withdrawn through line 137 and pump 138 for reuse in brine processes in the plant, or may be sent through line 140 to a municipal sewer.

The approximate quantities of chemicals necessary to process 300,000 gallons of raw waste water, from a typical textile bleaching and dying plant, having the analysis set forth in the following table, are:

| | |
|---|---|
| Sodium bisulfite | 258 pounds* |
| Ferrous sulfate (copperas) | 510 pounds* |
| Lime | 510 pounds* |
| Polyelectrolyte | 2.5 to 5.0 pounds* |
| Sulfuric acid | 43 gallons* |
| Sodium Hexametaphosphate | 12.6 pounds* |

*depending upon quality of waste.

A typical example of the improvement in the analysis of waste water treated by the process of this invention is demonstrated by the following table illustrating various properties and impurities in the raw waste water and comparative figures for the permeate recovered from the reverse osmosis process. The results are expressed in milligrams per liter except where other units are indicated.

| | Comparative Analysis | |
|---|---|---|
| | Raw Waste Water | Reverse Osmosis Permeate |
| pH | 8.5 | 5.4 |

-continued

Comparative Analysis

| | Raw Waste Water | Reverse Osmosis Permeate |
|---|---|---|
| Total Alkalinity | 520 | 10 |
| Color (Pt-Co units) | 455 | 30 |
| Turbidity (JTU) | 190 | 1 |
| Total Solids | 7060 | 308 |
| Fixed Solids | 6482 | 268 |
| Volatile Solids | 578 | 40 |
| Total Suspended Solids | 156 | 20 |
| Total Dissolved Solids | 6904 | 288 |
| Ammonia as N | 4.8 | 1.4 |
| Nitrate as N | 2.1 | 0.4 |
| Phosphorus, Total as P | 5.87 | 0.036 |
| Hardness as $CaCO_3$ | 110 | 3.49 |
| Calcium as $CaCO_3$ | 90 | 2.84 |
| Magnesium as $CaCO_3$ | 20 | 0.65 |
| Calcium as Ca | 36 | 1.13 |
| Magnesium as Mg | 4.84 | 0.16 |
| Sodium as Na | 2393 | 139 |
| Chloride | 3450 | 160 |
| Sulfate | 338 | 11 |
| Surface Active Agent* | 100 | >2 |
| Iron, Total | 0.64 | 0.12 |
| Aluminum | 0.12 | 0.031 |
| Copper | 0.12 | 0.005 |
| Chromium, Total | 0.007 | 0.003 |
| Zinc | 0.051 | 0.025 |
| Chemical Oxygen Demand | 795 | 12 |
| Biochemical Oxygen Demand | 310 | 4 |
| Total Organic Carbon | 193 | 15 |

*TRITON X-100 is typical

It will be appreciated by those skilled in this art that various conventional instruments, such as reduction-oxidation monitors, temperature recorders, pH monitor-controllers, turbidity monitors, flow meters, conductivity meters, volume records and the like, may be employed in practicing the present invention.

What is claimed is:

1. A process for treating textile plant waste water containing at least 50 ppm surface active agent consisting essentially of:
   adding iron salt as the sole chemical reagent in an amount sufficient to enable the turbidity to be subsequently adjusted to less than 10 JTU;
   adding lime slurry in an amount sufficient to adjust the pH of the waste water to about 8.0–9.5;
   allowing sufficient solids to precipitate from the pH adjusted waste water to achieve said turbidity;
   separating effluent from said precipitated solids;
   passing said separated effluent through at least one sand filter;
   adjusting the pH of the filtered effluent to below about 6.0; and
   subjecting said pH adjusted filtered effluent to reverse osmosis.

2. A process in accordance with claim 1 and further characterized by subjecting said waste water to preliminary treatment with an alkali metal sulfite to remove any residual hydrogen peroxide present.

3. The process of claim 2 wherein the alkali metal sulfite for removing excess hydrogen peroxide is sodium bisulfite.

4. The process of claim 1 wherein the iron salt is ferrous sulfate.

5. The process of claim 1 wherein the iron salt is ferric chloride.

6. The process of claim 1 wherein the pH of the sand filtered effluent is adjusted to a value between 5.0 and 6.0 by the addition of sulphuric acid.

7. The process of claim 1 and further characterized by adding sodium hexametaphosphate to the pH adjusted effluent prior to reverse osmosis.

* * * * *